United States Patent [19]
Eckardt

[11] Patent Number: 4,686,042
[45] Date of Patent: Aug. 11, 1987

[54] GRAVITY LIQUID FILTRATION APPARATUS WITH ROTATABLE DISCS THAT MOUNT SWINGING DISCHARGE ELEMENTS THEREBETWEEN

[75] Inventor: Fred H. Eckardt, Franklin, Tenn.

[73] Assignee: EMCO Filtration Systems, Inc., Franklin, Tenn.

[21] Appl. No.: 837,293

[22] Filed: Mar. 7, 1986

[51] Int. Cl.⁴ .................. B01D 33/04; B01D 35/22
[52] U.S. Cl. ................................ 210/386; 210/387; 210/396; 210/456
[58] Field of Search ............ 210/122, 386, 387, 396, 210/401, 456, 297, 298, 398

[56] References Cited

U.S. PATENT DOCUMENTS

| | | | |
|---|---|---|---|
| 620,786 | 3/1899 | Koerper et al. | 210/401 |
| 2,720,973 | 10/1955 | Gross | 210/387 |
| 2,876,904 | 3/1959 | Fowler | 210/387 |
| 4,057,437 | 11/1977 | Kracklauer | 210/401 |

FOREIGN PATENT DOCUMENTS 282122 10/1913 Fed. Rep. of Germany.
292144 8/1914 Fed. Rep. of Germany.

Primary Examiner—Richard V. Fisher
Assistant Examiner—Linda S. Evans
Attorney, Agent, or Firm—Watson, Cole, Grindle & Watson

[57] ABSTRACT

A gravity liquid filtration apparatus with increased filtering efficiency includes a frame; a pool-forming assembly mounted in the frame, the pool-forming assembly including two spaced-apart, rotatable containment discs and a discharge element mounted between the two containment discs; a filter medium supply roll; a filter medium carrier assembly for pressing an elongated filter medium supplied by the filter medium supply roll against the peripheries of the two containment discs along corresponding bottom arcs thereof, this filter medium carrier assembly being intermittently operable to move new filter medium against the two rotatable containment discs; and a liquid input element for supplying liquid influent between the two containment discs and downwardly onto a downwardly sloped portion of the filter medium. The discharge element operates to help solid contaminants which have deposited on the filter medium to be removed with the filter medium as it passes away from contact against the two containment discs.

4 Claims, 5 Drawing Figures

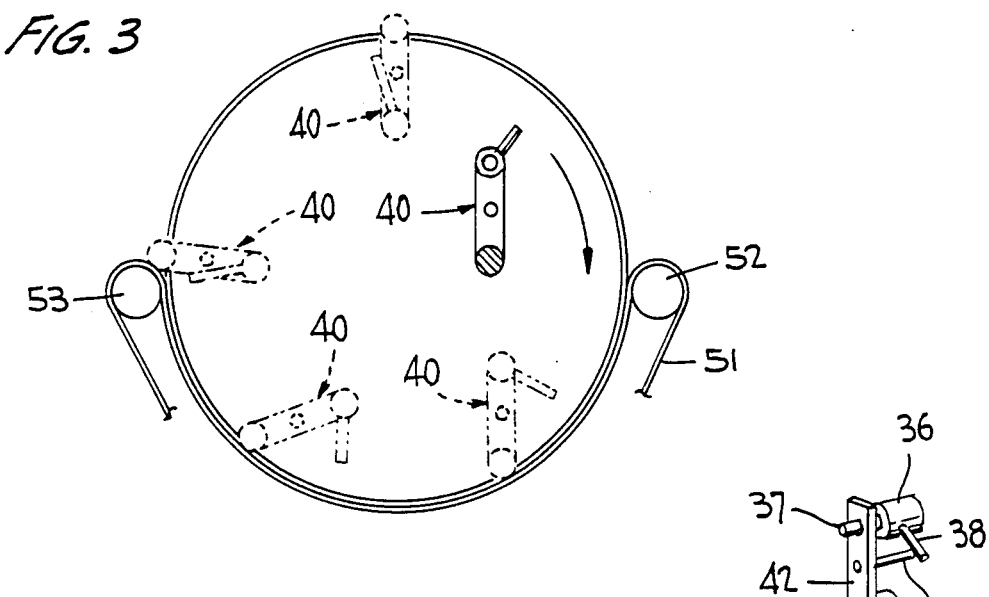
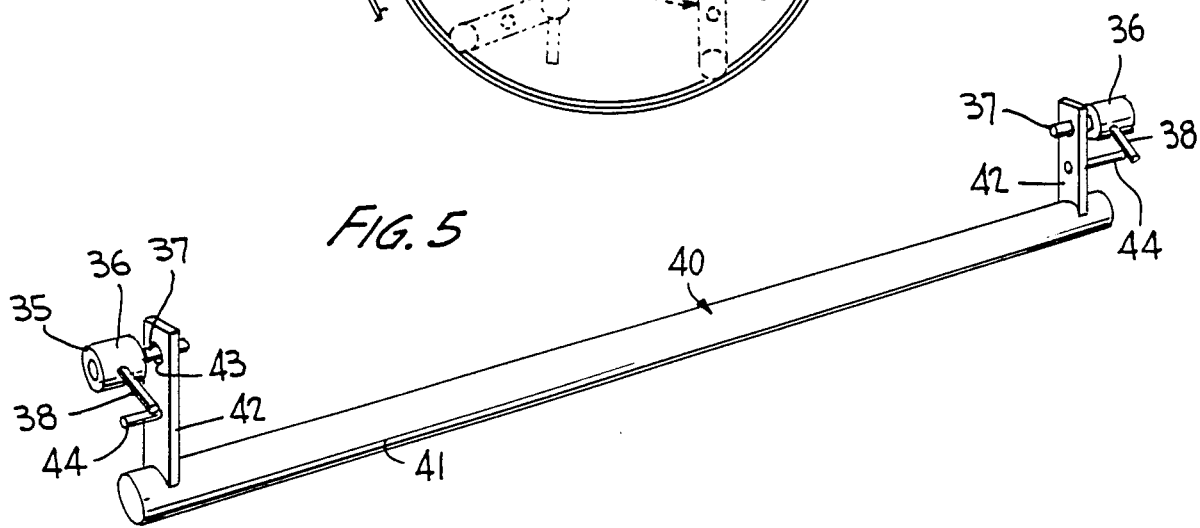
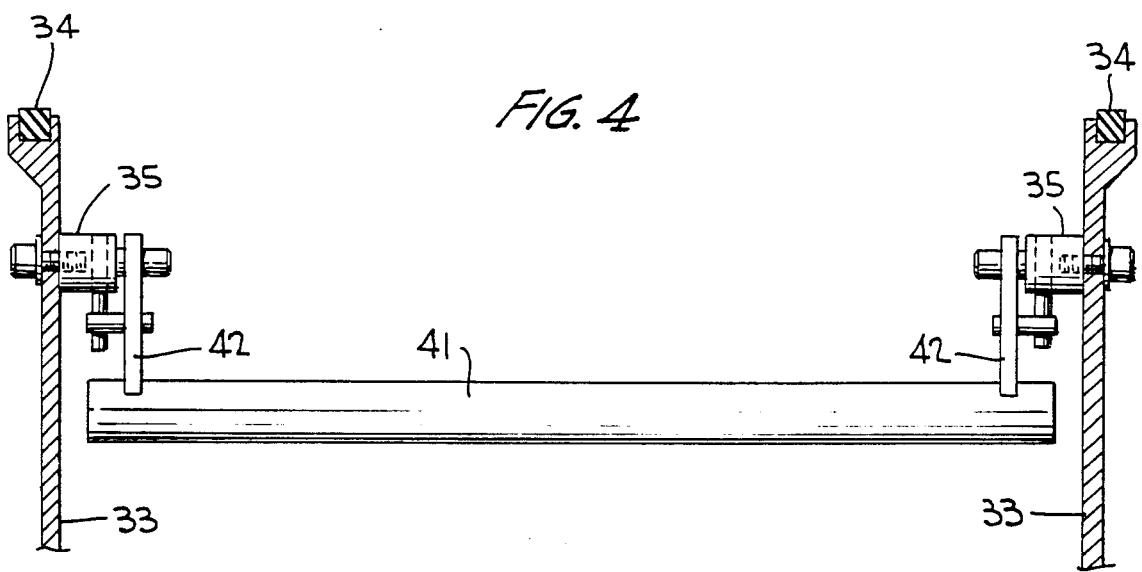

GRAVITY LIQUID FILTRATION APPARATUS WITH ROTATABLE DISCS THAT MOUNT SWINGING DISCHARGE ELEMENTS THEREBETWEEN

BACKGROUND OF THE INVENTION

1. Field of the Invention

The present invention relates to filtration devices, and more particularly to filtration devices which filter liquids using gravity.

2. The Prior Art

Various types of gravity liquid filtration devices are known. One type of gravity liquid filtration device uses an elongated filter medium which is supported by a wire belt conveyor and is pressed against the peripheries of two spaced apart, rotatable discs along corresponding bottom arcs thereof, such that a pool of liquid to be filtered is formed above the filter medium, the wire belt conveyor having an open mesh construction such that liquid which has passed downwardly through the filter medium by gravity can drain therethrough and into a liquid receptacle therebelow. Such a gravity liquid filtration device is shown in U.S. Pat. No. 2,876,904.

These known devices work reasonably well; however, there is always a desire to improve on their construction so as to increase their operating efficiency.

SUMMARY OF THE INVENTION

It is an object of the present invention to provide an improved gravity liquid filtration apparatus which is more efficient than known gravity liquid filtration devices.

According to the present invention the gravity liquid filtration apparatus includes a pool-forming apparatus that has a central shaft, two spaced apart containment discs rotatably mounted on the central shaft and a discharge element swingingly mounted between the containment discs; a filter medium carrier assembly which includes an endless wire belt of open mesh construction which is mounted such that a run thereof is pressed towards peripheral edges of the two containment discs along corresponding bottom arcs thereof; a filter supply roll for supplying an elongated filter medium to the filter medium carrier assembly so as to be supported by the endless wire belt along the noted run thereof; and a liquid input device, the liquid input device including a discharge head which has a nozzle portion that extends between the two containment discs and radially inwardly of their peripheries and provides a downwardly directed mouth so as to discharge influent liquid onto a downwardly sloped portion of the filter medium. The downward flow of influent liquid onto the downwardly sloped portion of the filter medium helps solids depositing on the filter medium to move downwardly along the filter medium, thus increasing the efficiency of liquid drainage through the filter medium. As solids accumulate on the filter medium, a liquid pool forms above the filter medium and between the two containment discs. The discharge element includes a contact rod which can contact the solid contaminants on the surface of the filter medium supported by the endless wire belt to help assure that the deposited solids, which might otherwise slide back into the liquid pool, will be removed from the pool as the filter medium is moved away from the containment discs during intermittent operation of the filter medium carrier assembly.

The invention will be better understood by reference to the accompanying drawings, taken in conjunction with the following discussion.

DESCRIPTION OF THE DRAWINGS

In the drawings,

FIG. 3 shows a transverse cross sectional view through the pool-forming assembly which forms a part of the gravity liquid filtration apparatus of FIGS. 1 and 2, as well as a portion of the cooperating endless carrier belt, FIG. 4 shows a longitudinal cross sectional view through a portion of the pool-forming assembly, showing in particular outer portions of its two containment discs, the mounting brackets attached to the containment discs and the discharge element mounted therebetween, and FIG. 5 shows a perspective view of the mounting brackets and the discharge element of the pool-forming assembly.

DETAILED DESCRIPTION OF THE PREFERRED EMBODIMENT

Figure 1:
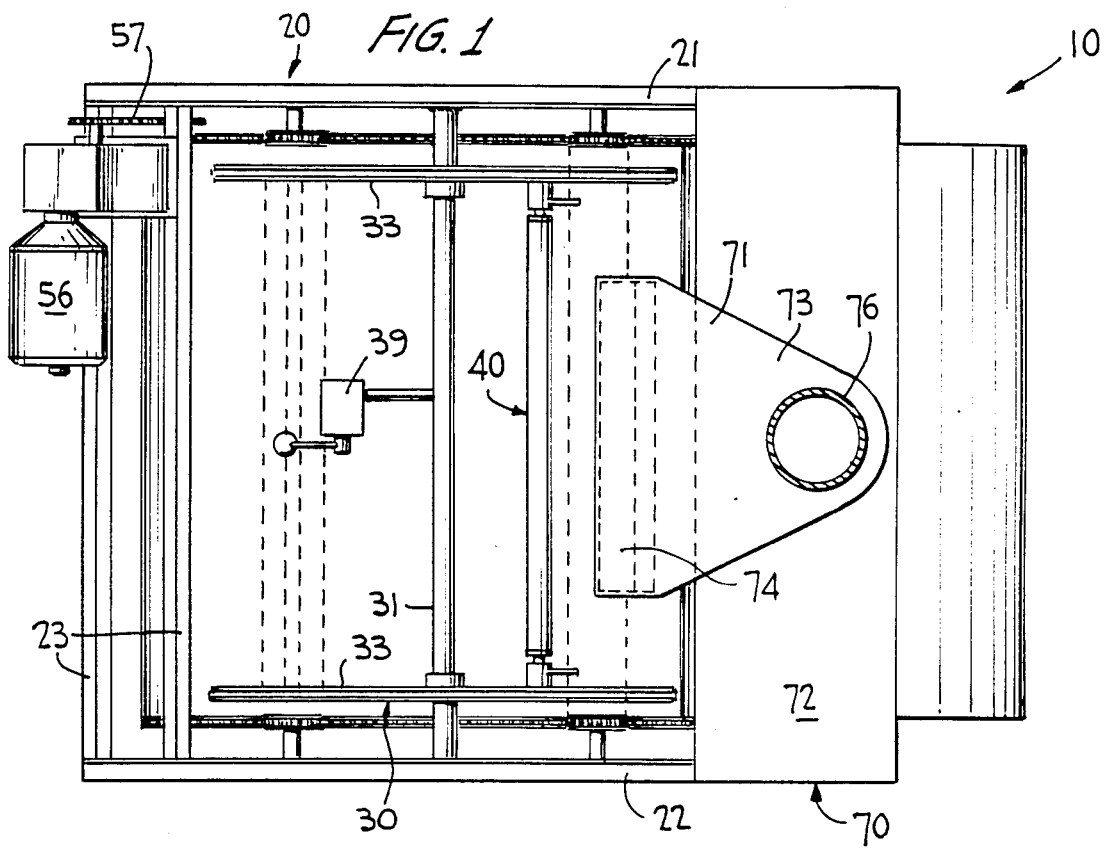
FIG. 1 shows a plan view of a preferred construction of a gravity liquid filtration apparatus according to the present invention.
Figure 2:
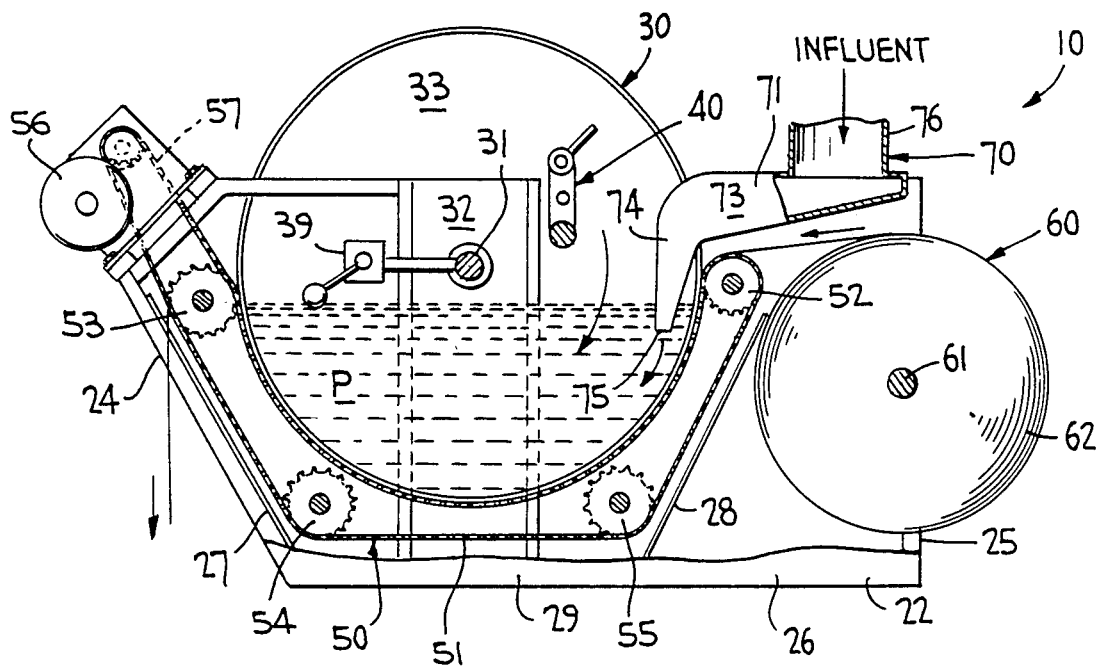
FIG. 2 shows an elevational side view of the gravity liquid filtration apparatus of FIG. 1, most of the right side wall thereof being broken away to better show its interior.

A preferred embodiment of gravity liquid filtration apparatus in accordance with the present invention is shown in FIGS. 1–5 and is generally identified by reference numeral 10. It includes a frame 20, a pool-forming assembly 30, a filter medium carrier assembly 50, a filter medium supply roll 60 and a liquid input element 70. In the following discussion the terms left, right, front, rear, top, bottom, upwardly and downwardly will be used on the assumption that the gravity liquid filtration apparatus is operatively oriented as shown in FIG. 2 and is being viewed from the end opposite the end which mounts the liquid input element, i.e., from the left in FIG. 2.

As can be seen in FIGS. 1 and 2, the frame 20 includes left and right side walls 21,22 and a plurality of cross beams 23 which extend therebetween (only two are shown in FIG. 1). As such, the frame is provided with a generally open front end 24, a generally open rear end 25 and an open bottom 26. Mounted between the side walls 21,22 are front and rear drainage plates 27,28 which converge to form a drainage opening 29 as they extend downwardly to the open bottom 26. These drainage plates function to guide liquid which has fallen thereon into a conventional liquid-receiving tank positioned therebelow (not shown).

The pool-forming assembly 30, which is positioned above the drainage opening, includes a central shaft 31 which is fixedly mounted at its opposite ends in flange plates 32, which are removably connected to the left and right side walls 21,22. Rotatably mounted on the central shaft 31 are two spaced apart containment discs 33, each containment disc being preferably made of cast aluminum. Each containment disc includes a sealing ring 34 mounted around its peripheral edge, each sealing ring being preferably made of molded polyurethane. Mounted on the facing sides of the containment discs at corresponding locations near their peripheral edges are respective mounting brackets 35, each mounting bracket including a cylindrical hub 36, a swing pin 37 which extends towards the other containment disc in parallel with the central shaft 31, and a lift pin 38 which extends perpendicularly to the swing pin 37 and generally radially outwardly with respect to the central shaft 31. Fixedly mounted on the central shaft 31 at a point between the two containment discs 33 is a conventional float switch 39.

The pool-forming assembly 30 also includes a discharge element 40 which is mounted between the swing pins 37 of the two mounting brackets 35. The discharge element includes a contact rod 41 having two support arms 42 near its opposite ends, each of the support arms including a hole 43 for mounting on the swing pin 37 of the associated mounting bracket 35 and a support pin 44 which extends in parallel with the contact rod 41 and in a direction away from the other support arm. These support pins 44 are abuttable against the lift pins 38 of the associated mounting brackets. As the two containment discs 33 rotate around the central shaft 31, the feed element 40 will rotate around the swing pins of the two mounting brackets 36 and will be progressively oriented as shown in positions a-d in FIG. 3. These positions will be referred to again below.

The filter medium carrier assembly 50 includes an endless wire belt 51 having an open mesh design and four rollers around which the endless wire belt is supported, i.e., an idler roller 52, a driven roller 53, an idler roller 54 and a take-up roller 55, all of these rollers being generally located between the drainage plates 27 and 28. The idler roller 52 and the driven roller 53 are positioned near opposite locations along the corresponding peripheries of the two containment discs 33, such that an upper run of the endless wire belt 51 extending therebetween will be pressed against the peripheral edges of the containment discs along corresponding bottom arcs thereof. When a filter medium is supported on the endless wire belt along this run, it will be pressed against the sealing rings 34 along corresponding bottom arcs of the peripheral edges of the containment discs 33, thus enabling a liquid pool P to be formed thereabove. The filter medium carrier assembly also includes a drive motor 56 which is mounted on two cross beams 23 at the front end 24 of the frame 20 near its left side wall 21, and a drive chain 57 connected between the drive motor 56 and a sprocket on the driven roller 53. The operation of the drive motor 56 is controlled by the float switch 39.

The filter medium supply roll 60 includes a central shaft 61 which is rotatably journalled at its opposite ends in the left and right side walls of the frame 20 near its rear end 25, and an elongated filter medium 62 wrapped therearound. The central shaft 61 is located in the frame 20 such that the filter medium passing towards the endless wire belt 51 (as it moves over the idler roller 52) avoids contacting the rear drainage plate 28.

The liquid input element 70 includes a delivery head 71, a support plate 72 which mounts the delivery head on top of the frame 20 near its rear end 25, and an inlet pipe 76 connected to the delivery head. The delivery head 71 includes a flared portion 73 and a nozzle portion 74, which extends between and radially inwardly of the peripheral edges of the containment discs 33 and is directed vertically downwardly to provide a downwardly directed, elongated mouth 75. Influent liquid which is discharged from the mouth 75 is directed against a downwardly sloped portion of the filter medium 62, which is of course supported by the endless wire belt 51.

The inventive gravity liquid filtration apparatus operates as follows. Influent liquid is caused to flow through the inlet pipe 76, through the flared portion 73 of the delivery head 71, and out of the mouth 75 of the nozzle portion 74 so as to be downwardly discharged onto the downwardly sloped portion of the (not moving) filter medium 62 (which is pressed against the sealing rings 34 along corresponding bottom arcs of the peripheries of the two containment discs by the endless wire belt 51). Liquid passes through the filter medium 62, then through the endless wire belt 51 and, with the help of the drainage plates 27 and 28, through the drainage opening 29 into a liquid-receiving tank, while solid contaminants (sludge) are deposited on the filter medium. The downward flow of liquid onto the downwardly sloped portion of the filter medium 62 washes the solid contaminants thereon further downwardly along the filter medium, thus helping to clear the downwardly sloped portion of the filter medium of solid contaminants. This increases the time period during which liquid can freely drain through the filter medium by gravity. As the solid contaminants accumulate on the filter medium, liquid will flow therethrough less and less easily, resulting in the formation of liquid pool P thereabove and between the two containment discs 33. The level of liquid pool P will rise, thus increasing the liquid head pressure against the filter medium (forcing more liquid through the filter medium) until the solid contaminants form a nonpermeable cake on the filter medium. The level of the pool P will keep on rising until it causes the float ball of the float switch 39 to activate the float switch, which, because it is electrically connected to the drive motor 56, will cause the drive motor to operate. The drive motor 56, via the drive chain 57, will rotate the driven roller 53, which in turn will cause the endless wire belt 51 to move around the rollers 52-55, resulting in rotation of the two containment discs 33 and movement of new filter medium 62 into the liquid pool P. With new filter medium 62 at the bottom of the liquid pool P, liquid will flow therethrough and the liquid pool P will drop. At a certain level the float switch 39 will cause the drive motor 56 to stop operating. The movement of the filter medium 62 into the liquid pool P by the endless wire belt 51 will be stopped. It will be started again when the rising level of liquid pool P again causes the float switch 39 to activate the drive motor 56.

Solid contaminants that have deposited on the filter medium 62 will pass with the filter medium around the driven roller 53 and downwardly into a waste receptacle, aided by the contact rod 41. In this regard, as the containment discs 33 rotate, the discharge element 40 swings around the swing pins 37 of the mounting brackets 35 as indicated by positions a, b, c, d and e in FIG. 3. In position a, the discharge element 40 hangs freely downwardly from the swing pins 37. In position b, it still hangs from the swing pins but the contact rod 41 thereof is in initial contact with the surface of the filter medium 62. In position c, the discharge element has swung to some extent about the swing pins due to the location of the mounting brackets 35 near the peripheral edges of the containment discs 33. In position d, the discharge element has moved to a generally horizontal orientation, its contact rod extending somewhat radially outwardly of the peripheral edges of the containment discs and just above the driven roller 53. In this position the lift pins 38 of the two mounting brackets 35 abut against the support pins 44 on the support arms 42 of the discharge element. In position e, the discharge element is vertically upwardly oriented due to contact between the lift pins 38 and the support pins 44. Between positions e and a the discharge element freely swings about the swing pins 38 to hang vertically downward again.

Contact of the contact rod 41 against the filter medium between positions b and d helps force solids, which might otherwise slide back into the pool by gravity, out of the liquid pool P with the filter medium and over the driven roller 53.

Although a preferred embodiment of the invention has been discussed in detail, various modifications therein can be made and still fall within the scope of the appended claims. For example, the pool-forming assembly can include multiple discharge elements which are mounted between the rotatable containment discs at spaced apart locations around their circumferences, e.g., when the liquid influent contains large amounts of solid contaminants.

I claim:

1. A gravity liquid filtration apparatus which comrpises a frame means having opposite side walls and providing an open bottom, a pool-forming means mounted between said opposite side walls, said pool-forming means including a central shaft, two spaced apart containment discs rotatably mounted on said central shaft, said containment discs having peripheral edges, and two mounting brackets respectively mounted to corresponding locations on facing sides of said two containment discs, each mounting bracket including a swing pin extending toward the other containment disc, and a discharge element mounted on and between said swing pins, said discharge element including a contact rod which can contact a run of an endless carrier belt which is pressed against the peripheral edges of said two containment discs, a filter medium supply means which includes an elongated filter medium and which is capable of discharging said elongated filter medium therefrom, a filter medium carrier means for supporting said elongated filter medium and for pressing it against the peripheral edges of said two containment discs along corresponding bottom arcs thereof, said filter medium carrier means comprising an endless wire belt and a plurality of rollers which support said endless wire belt such that a run thereof is pressed towards said peripheral edges of said containment discs, a drive means for driving said filter medium carrier means, and a liquid input means, said liquid input means including a delivery head having a nozzle portion which extends between and radially inwardly of the peripheries of said two containment discs, said nozzle portion having an elongated mouth which is aimed downwardly so as to discharge liquid to be filtered onto a downwardly sloped portion of the filter medium supported on said filter medium carrier means.

2. A gravity liquid filtration apparatus as defined in claim 1, wherein each mounting bracket includes a lift pin which is generally radially outwardly oriented with respect to said central shaft, and wherein said discharge element includes support arms connected to said contact rod near its opposite ends, each support arm including means defining a hole for mounting on the swing pin of the associated mounting bracket and a support pin which extends in parallel with said central shaft, each support pin being supported by the lift pin of the associated mounting bracket as said discharge element moves upwardly due to rotation of said containment discs.

3. A gravity liquid filtration apparatus as defined in claim 1, wherein one of said plurality of rollers is a driven roller, and wherein said drive means includes a drive motor mounted on said frame and a drive chain mounted between said drive motor and said driven roller.

4. A gravity liquid filtration apparatus as defined in claim 1, wherein said delivery head includes a flared portion to which said nozzle portion is connected, and wherein said liquid input means includes a feed pipe connected to said flared portion.

* * * * *